Oct. 1, 1929.      P. LESSMAN      1,729,883
HARROW POLE
Filed Feb. 18, 1927
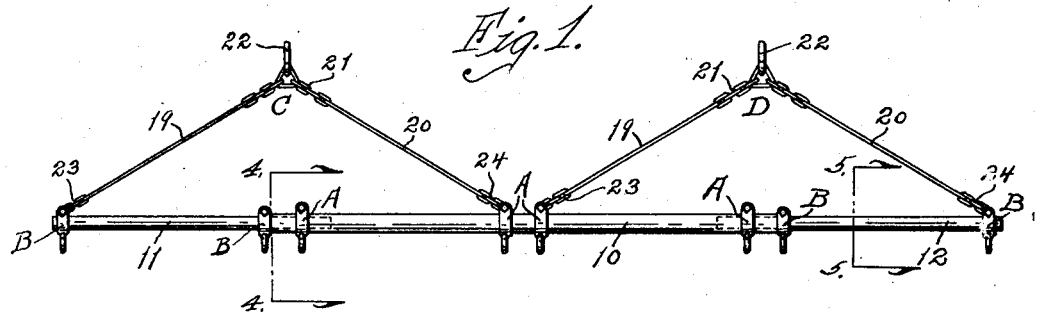
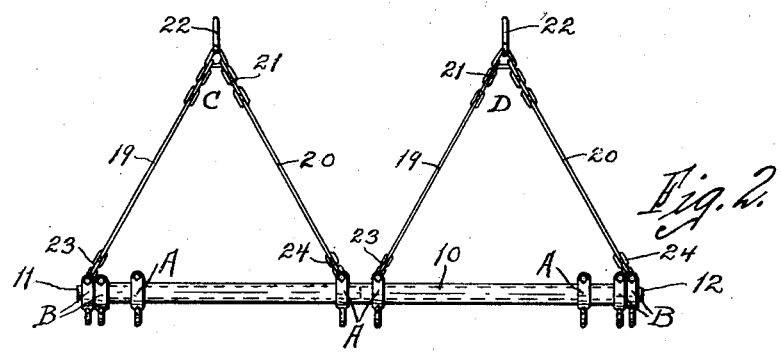
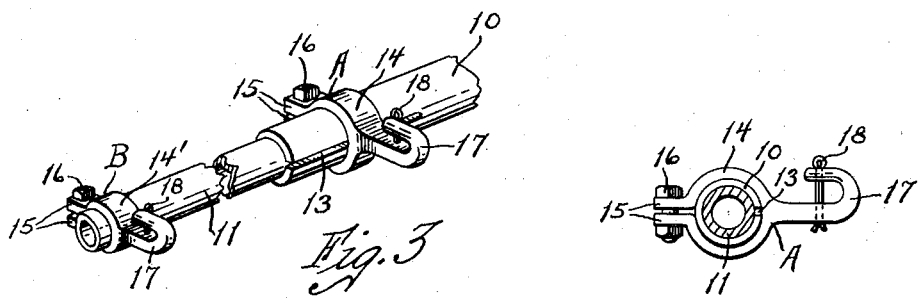
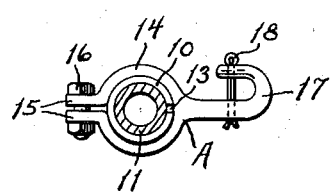
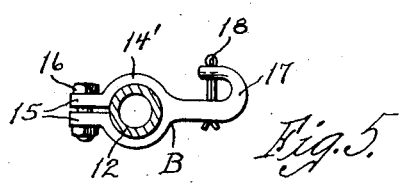
Inventor
PAUL LESSMAN
By Earl M. Sinclair
Attorney Patented Oct. 1, 1929

1,729,883

UNITED STATES PATENT OFFICE

PAUL LESSMAN, OF WAKEFIELD, NEBRASKA

HARROW POLE

Application filed February 18, 1927. Serial No. 169,220.

The object of my invention is to provide an improved pole for use with harrows and the like and so arranged that it may be collapsed or shortened in length at times for passage through a relatively narrow space or for storage or transportation.

More specifically, my invention consists in an improved harrow pole composed in the main of a central tubular section and a smaller tubular section slidably mounted at each end of the main section, together with means for holding the end sections in extended position.

With these and other objects in view, my invention consists in the construction, arrangement and combination of elements hereinafter set forth, pointed out in the claims and indicated by the accompanying drawing in which—

Fig. 1 is a plan view of the device in extended position.

Fig. 2 is a plan view showing the end sections telescoped within the central section whereby the length of the device is materially lessened.

Fig. 3 is a perspective view of one end portion of the device showing the means for clamping the central section relative to one of the main sections.

Fig. 4 is a cross-section on the line 4—4 of Fig. 1.

Fig. 5 is a cross-section on the line 5—5 of Fig. 1.

In the construction of the device as shown, a main section 10 is provided which is composed of a tubular member such as a metallic pipe, open at both ends. End sections 11 and 12 are telescopically arranged in the end portions of the main section 10 and said end sections also are composed of tubes or pipes of slightly less diameter than the main section and fitting snugly in the ends thereof. At each end, the main section 10 is formed with a longitudinal slot 13. A plurality of clamping and attaching devices A are mounted on the central or main section 10 and each of said devices is composed of a sleeve 14 embracing the tubular section 10, said sleeves being split and extended laterally on the forward side of the pipe to provide apertured ears or lugs 15 through which a clamping bolt 16 is passed. On the opposite or rear sides of the pipe 10 each device is formed with a hook 17 by which attachment may be made to a harrow (not shown) or other similar implement. The hook 17 may be drilled to receive a cotter key 18 to prevent detachment of the fastening devices. Mounted on the end sections 11 and 12 are similar clamping and attaching devices B which are in all respects like the devices A except that their sleeves 14' are of less diameter than the sleeves 14 and fit snugly on said end pipes. Any suitable number of the devices A and B may be employed and in this instance, I have illustrated four of each, two of the devices B being mounted on each of the end sections, one near the outer end and one abutting the end of the central section. The devices A and B may be adjusted on their respective sections by loosening the bolts 16 and sliding them to the desired position after which they may be fixed by tightening said bolts. Suitable draft connections are provided at the forward side of the pole and in this instance, there are two sets of such connections designated at C and D. Each of these connections includes a pair of rods 19 and 20 connected at their forward ends by a short chain 21, to the central portion of which is attached an equalizer hook 22. The rear ends of the rods 19 and 20 are connected by short chains 23 and 24 to the clamping bolts 16 of some of the devices A and B. As here shown, one end of each draft device is attached to the outer device B of one of the end sections and the opposite end is attached to an inner device A of the central section 10.

In practical use the device is ordinarily employed in extended form as shown in Fig. 1 and is used in the ordinary manner for providing the attachment between a tractor or draft animals and an agricultural device such as a harrow. The attaching and clamping devices A and B are held in their adjusted positions on the respective pole sections by tightening the bolts 16 and the outer devices A on the main section have the further function of causing a clamping engagement between the slotted end portions of said main section and the end sections 11 and 12, by compressing such slotted ends thereon and preventing sliding movement of the end sections. When it is desired to collapse the device for the purpose of transportation or storage or for passage of the implement through a relatively narrow space such as a gate, the outer clamping devices A are loosened and also the inner clamping devices B, thus permitting the end sections 11 and 12 to be telescoped within the main section A as shown in Fig. 2, thus reducing the effective length of the device to little more than the length of the main section 10. In such operation, the pivotal and flexible construction of the draft devices C and D offers no resistance to the sliding movement of the sections 11 and 12. It is presumed that when the pole is thus collapsed, the width of the harrow attached thereto, may also be reduced by superposing its end sections upon the central section or sections in a common manner.

This provides a very efficient and convenient form of harrow pole which is economical of manufacture and may be employed in various lengths as well as being collapsible in the manner just above stated. For instance the end sections may be removed altogether at times and the central section 10 used alone for a connection to a relatively narrow implement.

I claim as my invention:

1. A harrow pole comprising a central tubular section, having a slot at each end, an end section telescopically mounted in each end of said central section, and clamping devices mounted on said main section and adapted to compress the slotted portion thereof upon the inclosed end section.

2. A harrow pole comprising a tubular section having a slotted end portion, a second section telescopically mounted in said first section, and a clamping device mounted on said first section and adapted to compress the slotted portion thereof upon the inclosed portion of the second section, said clamping device being formed with a hook for attachment to a harrow.

3. A harrow pole comprising a tubular section having a slotted end portion, a second section telescopically mounted in the first section, and a clamping device mounted on the first section, said clamping device including a split sleeve having an attaching hook formed on its rearward face and having apertured ears on its forward face on opposite sides of the split therein and also having a clamping bolt mounted through said ears for compressing the slotted portion of the first section on the inclosed portion of the second section.

PAUL LESSMAN.